United States Patent

[11] 3,604,285

| [72] | Inventor | John Erland Sixten Olsson<br>Trollhattan, Sweden |
|---|---|---|
| [21] | Appl. No. | 25,982 |
| [22] | Filed | Apr. 6, 1970 |
| [45] | Patented | Sept. 14, 1971 |
| [73] | Assignee | Saab-Scania Aktiebolag |

[54] ENERGY-ABSORBING DEVICE AND METHOD OF MAKING THE SAME
5 Claims, 6 Drawing Figs.

| [52] | U.S. Cl. | 74/492,<br>29/148.4 A, 29/155 C, 188/1 C |
|---|---|---|
| [51] | Int. Cl. | B62d 1/18 |
| [50] | Field of Search | 74/492,<br>493; 188/1 C; 29/155 C, 148.4 A |

[56] References Cited
UNITED STATES PATENTS

| 2,742,946 | 4/1956 | McGrann | 29/155 C |
| 3,392,599 | 7/1968 | White | 74/492 R |
| 3,521,341 | 7/1970 | Hornlein et al. | 29/155 C X |

*Primary Examiner*—Milton Kaufman
*Attorney*—Ira Milton Jones

ABSTRACT: The energy-absorbing device comprises telescoped inner and outer members between which hard balls are confined. Its inner member is a tube with a circumferentially undulating wall that defines circumferentially alternating inwardly and outwardly opening bays and is therefore radially elastically deformable. Balls are received at longitudinally spaced intervals in the radially outwardly opening bays. The outer member has a spherical inwardly opening socket for each ball to hold the ball against displacement relative to the outer member. When either member moves lengthwise relative to the other, the balls locally elastically deform the inner member, thus dissipating energy.

PATENTED SEP 14 1971
SHEET 1 OF 2
3,604,285
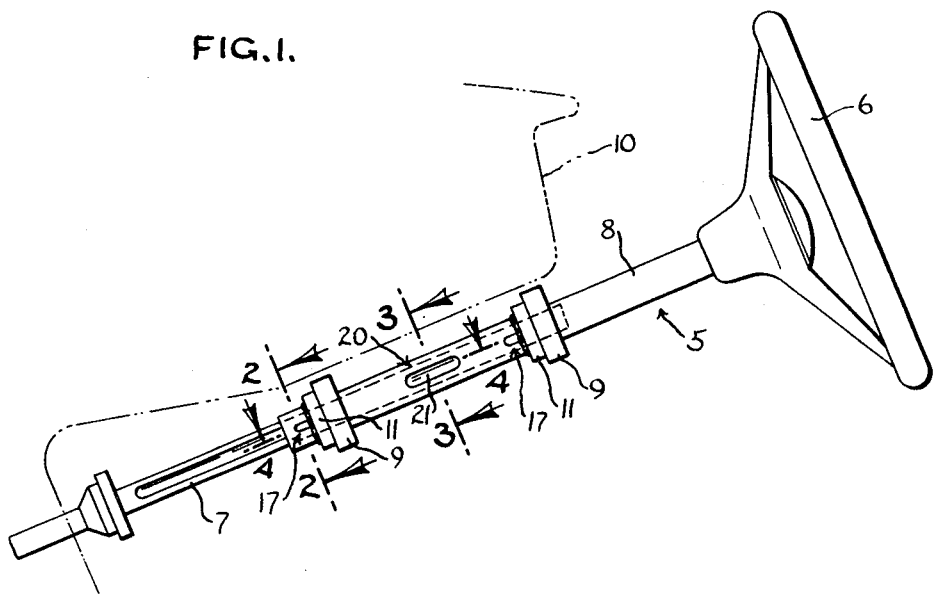
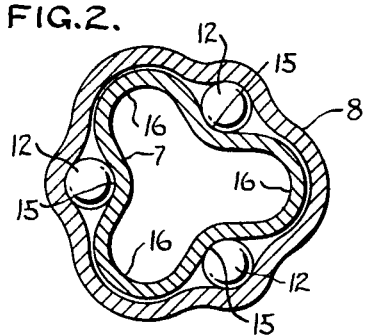
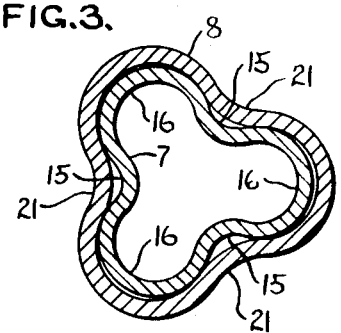
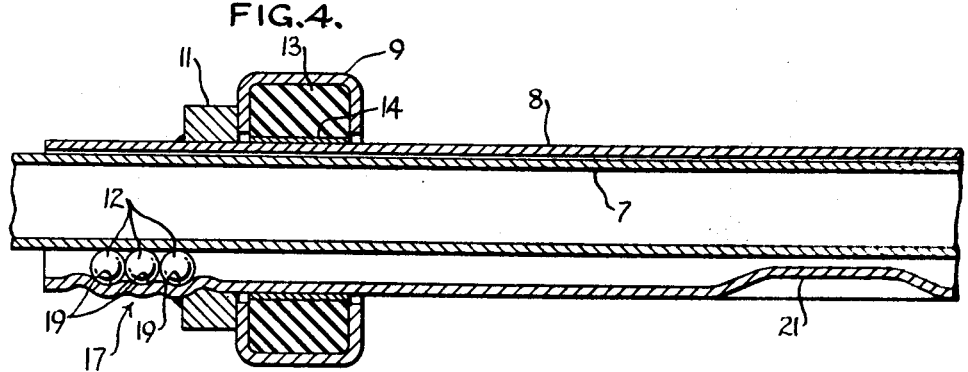
INVENTOR
John Erland Sixten Olsson
BY
ATTORNEY

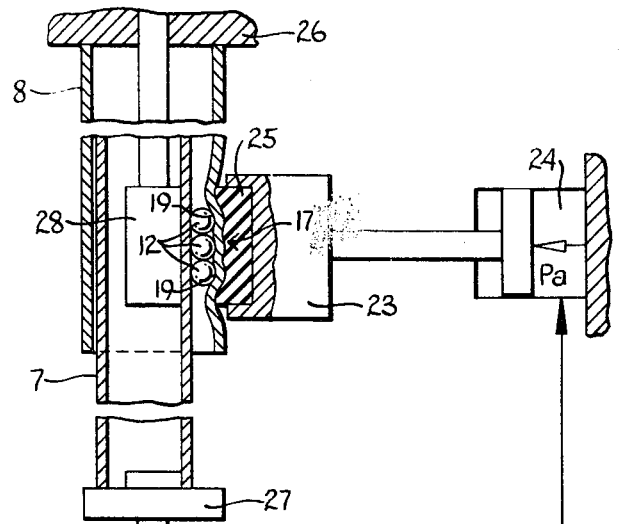
FIG.5.
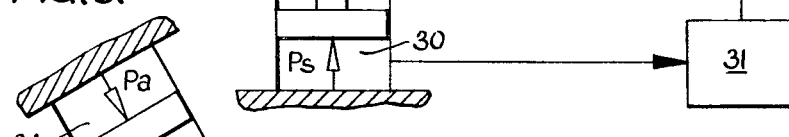
FIG.6.
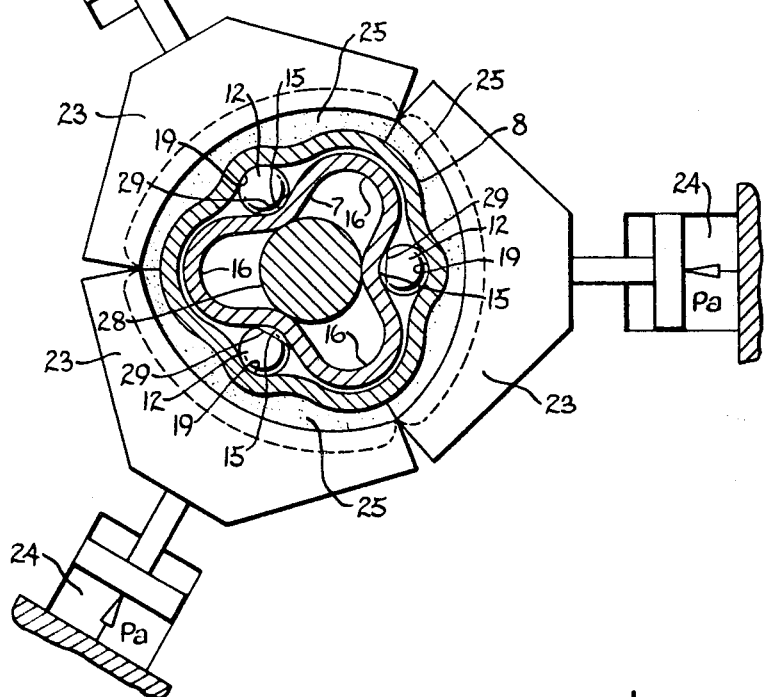

3,604,285

1

ENERGY-ABSORBING DEVICE AND METHOD OF MAKING THE SAME

This invention relates to energy-absorbing devices of the type comprising telescoped elongated members which can be lengthwise displaced relative to one another but which resist such displacement with a predetermined force; and the invention is more particularly concerned with a telescoping energy-absorbing device which is capable of transmitting torque and which is thus suitable for use as an automobile steering column that is intended for controlled telescoping collapse in the event of a collision. The invention further relates to a method of making such an energy-absorbing device.

Energy-absorbing devices of the general type to which this invention relates are exemplified by U.S. Pat. No 3,392,599, issued July 16, 1968 to R. L. White. The energy-absorbing device of that prior patent comprised a pair of telescoped tubular members between which a plurality of hard balls were confined with an interference fit. Upon application of a sufficient axial force to either of the tubular members, it shifted axially relative to the other, and the balls permitted such relative displacement but yieldingly resisted it by plastically deforming the metal of the tubular members, forming furrows or grooves in the softer metal of the telescoped members as they rolled between them.

The device of the White patent possessed certain deficiencies which it is a general object of the present invention to overcome.

One disadvantage of the prior structure was that both of its telescoped members were of circular cross section and therefore it could not be relied upon to transmit relatively high torque forces. In fact, it yielded under torsion forces of the same value as the axial forces at which it was designed to yield. For this reason it had to cooperate with another shaft which was specifically intended for transmitting torque.

Another deficiency of the device of the White patent was that its collapse-load value could not be precisely controlled because the force required to displace one of the telescoped members relative to the other depended upon several critical parameters, namely the hardness of the metals comprising the two telescoped members, the diameter of the balls, and the radial spacing between the telescoped members. Furthermore, since the diameter of the balls was larger than the radial spacing between the telescoped members, the prior device had the further disadvantage of being somewhat difficult to assemble.

A more important disadvantage of the energy-absorbing device of the White patent was that the displacement force could vary substantially from its design value if there was any substantial lateral component to the collapsing load imposed upon it. This disadvantage arose from the fact that plastic deformation of the telescoped members was relied upon for energy absorption. Under the influence of a bending moment, a few of the balls could effect intense localized plastic deformations of one of the telescoped members by which they were driven so far into the wall of that member as to be carried along in pockets therein rather than rolling between the members, with the result that the captive balls exerted less than their intended resistance to movement of that member during their travel with it.

Another disadvantage that arose from the employment of the principle of plastic deformation was that the device of the White patent could not ordinarily be reused after an energy-absorbing collapse, owing to the permanent character of plastic deformation. Hence the prior device was unsuitable for automobile bumpers and other applications where energy-absorbing collapse of the device is necessarily accompanied by any structural damage.

As above indicated, it is a general object of the present invention to provide a telescoping energy-absorbing device which has none of these deficiencies and which, in particular, will yield to an axial collapsing load with a predetermined and readily controllable resistance force irrespective of whether or

2 not the collapsing load has a substantial lateral component, but will nevertheless transmit high torsion forces, and can be reused after energy-absorbing collapse if it is not structurally damaged.

Another object of this invention is to provide an energy-absorbing device of the character described which can be assembled quickly and easily with relatively simple equipment and which can be effectively adjusted in the course of its assembly to provide for its yielding under exactly a desired displacement force.

Another and more specific object of this invention is to provide an energy-absorbing device having a pair of telescoped members, one of which is adapted to be displaced axially relative to the other in response to a load force, which device absorbs energy by elastic deformation of one of the telescoped members and therefore produces no permanent deformation of that member as a result of energy-absorbing operation of the device.

It is also an object of this invention to provide a method of assembling an energy-absorbing device of the character described whereby the load force to which the device is responsive can be accurately and readily predetermined, and which method lends itself to practice with relatively simple and inexpensive automatic equipment.

With these observations and objectives in mind, the manner in which the invention achieves its purpose will be appreciated from the following description, which exemplifies the invention, it being understood that such changes may be made in the precise structure and method herein disclosed by way of illustration as come within the scope of the appended claims.

In the accompanying drawings:

FIG. 1 is a view in side elevation of an automobile steering column assembly embodying the principles of the present invention;

FIG. 2 is a view in cross section taken on the plane of the line 2—2 in FIG. 1;

FIG. 3 is a view in cross section taken on the plane of the line 3—3 in Fig. 1;

FIG. 4 is a view in longitudinal section taken along the line 4—4 in FIG. 1;

FIG. 5 is a longitudinal sectional view through the steering column assembly, showing the same in its relation to apparatus used for its assembly, said apparatus being shown more or less diagrammatically; and FIG. 6 is a view in cross section through the steering column assembly showing the same in its relation to the assembly apparatus.

Referring now to the accompanying drawings, the numeral 5 designates generally a steering column embodying the principles of this invention and which serves as a torque tube by which rotation is transmitted from a steering wheel 6, affixed to the upper end of the steering column, to steering gear (not shown) to which the steering column is connected at its lower end.

In general, the steering column comprises elongated inner and outer members 7 and 8, respectively, which are normally in telescoped, axially extended relationship, with each having an end portion projecting a substantial distance beyond the other. When a generally axial load of a predetermined magnitude is applied to either of the members, the loaded member is axially displaced relative to the other, and all during its displacement it cooperates with the other member and with balls 12, as described hereinafter, to oppose a steady force to the applied load, thus absorbing energy.

As shown, the outer telescoped member 8 is the upper one, to which the steering wheel 6 is fixed, and it comprises a tube having a circular cross section along most of its length. It is rotatably journaled in suitable annular brackets 9 that are attached to the automobile body structure 10, coaxially with one another and lengthwise spaced along the steering column, one near the lower end of the outer member 8 and one just below the upper end of the inner member 7. A stop ring 11 is externally secured to the outer member directly below each bearing bracket, to engage the bearing bracket and confine the outer member against upward displacement. In each of the bearing brackets there is a rubber bushing 13 within which there is a suitable bearing sleeve 14.

The inner telescoped member 7 is hollow, and its wall is made of a metal that is relatively hard but elastically deformable. From its upper end down to a point near its lower end, the wall of the inner telescoped member has a shape in cross section that can be generally characterized as cloverleaf and which is more specifically described as circumferentially undulating or serpentine to define radially outwardly opening bays 15 that alternate around the circumference of the member with radially inwardly opening bays 16. It will be apparent that by reason of this configuration the inner telescoped member, unlike a circular section tube, has substantial radial and circumferential elasticity.

The balls 12 are received in the radially outwardly opening bays 15, and the outer telescoping member 8 at all times urges the balls radially inwardly with a force sufficient to produce local elastic deformation of the inner member.

The generally circular cross section of the outer member 8 is interrupted at two axially spaced-apart ball zones 17, each just below one of the stop rings 11. At each of these zones the wall of the outer member is deformed out of roundness to define spherical sockets 19, in each of which one of the balls 12 is confined. Each of the sockets 19 is of course radially aligned with one of the radially outwardly opening bays 15 and opens to the same. As shown in FIG. 4, there are preferably three balls in each bay at each of the ball zones 17.

When an endwise force is imposed upon either of the telescoped members that is large enough to displace it axially relative to the other, the balls 12 remain in their sockets in the outer member and are thus confined against any displacement relative to that member. Each ball can of course rotate in its socket. The balls thus roll along their respective bays 15 in the inner member, locally elastically deforming the inner member as they do so. Such elastic deformation of the inner member of course consumes energy in an amount which depends upon the radially inward force under which the balls engage the inner member. The energy consumed in this elastic deformation is substantially constant all during relative motion between the balls and the inner member.

When the energy-absorbing device of this invention is subjected to a collapsing force that has a substantial lateral component, the bending moment imposes an increased load upon both telescoped members at the ball zones 17. However, such bending moment produces no appreciable plastic deformation of either telescoped member. The spherical surface which each ball socket 19 presents to its ball is of such are that the ball imposes too low a surface pressure upon it to cause plastic deformation, while the inner member 7, by reason of its radial and circumferential elasticity, further helps to prevent plastic deformation of the outer member and is itself substantially immune to plastic deformation.

Axially intermediate the ball zones 17 the outer member 8 has another zone 20 in which its cross section is noncircular. In the last mentioned zone 20 the outer member is formed with a generally cloverleaf cross-sectional shape (see FIG. 3) to have radially inwardly projecting ridges 21 that engage rather closely in the radially outwardly opening bays 15 of the inner member and thus maintain a good torque transmitting connection between the two members. The ridges 21 play no significant part in energy absorption during relative lengthwise motion of the telescoped members.

Apparatus with which the device of this invention can be assembled and by which its resistance to telescoping contraction can be predetermined comprises two sets of clamping jaws 23, and a hydraulic actuating cylinder 24 for each jaw by which the jaw can be moved toward and from the other jaws of its set. There is a set of jaws for each of the ball zones 17 (only the lower set of jaws is shown in the drawings), and each set comprises a jaw for each radially outwardly opening bay 15 in the inner telescoped member. As shown in FIG. 2 the inner member has three radially outwardly opening bays, and, correspondingly, there are three jaws in each set, as illustrated in FIG. 6.

The three jaws 23 of each set and their actuating cylinders move along axes coplanar with one another. The jaws are converged radially inwardly relative to the telescoped members to form the ball-receiving sockets 19 in the outer member, and to this end the face of each jaw is provided with a cushion 25 of rubber or similar resiliently deformable material.

Cooperating with the jaws 23 and cylinders 24 are the head 26 and table 27 of a generally conventional hydraulic press, which respectively engage the upper end of the outer telescoped member and the lower end of the inner telescoped member. To prevent the inner member from being deformed by forces from the jaws 23, imposed upon it through the outer member and the balls, a rigid mandrel 28 projects down into the inner member at tangents to the radially inner surfaces of the ball receiving bays 15.

In assembling the energy-absorbing device, the several balls 12 are secured in their desired positions in the bays 15 of the inner member by small bodies 29 of a readily frangible bonding material such as wax. The outer member 8 is suitably secured to the press head 26. The inner member, with the balls attached to it, is inserted axially into the outer member, but to an extent somewhat less than is desired for the finished assembly, that is, the distance between the remote ends of the telescoped members is initially few centimeters greater than the length of the finished steering column. Since the wall of the outer member is at this time circular all along its length, the inner member fits freely into the outer one, with no interference from the balls.

With the members preliminarily telescoped as just described, and with the mandrel 28 in place, the hydraulic cylinders 24 are actuated to converge the jaws 23, and the latter plastically deform the outer member at each of the ball zones. Because of the cushion 25 on the jaws, the outer member is in effect formed by the balls, to thus produce the desired closely fitting spherical socket 19 for each ball.

As the jaws 23 are converged in engagement with the outer member, a hydraulic cylinder 30 which actuates the press table 27 slowly raises the latter, telescopingly contracting the steering column members. The force required to move the inner member upwardly in this manner will depend upon the force with which the balls engage the inner member. Hence fluid pressure $P_s$ in the press table cylinder can be measured to control the force $P_a$ applied to the jaws 23. Accordingly, there is a fluid pressure connection between the cylinder 30 and a fluid pressure responsive control device 31 of known type, and the control device in turn regulates feeding of fluid to the jaw cylinders 24. The application of converging force to the jaws is terminated when the displacement load $P_a$ reaches a predetermined value that takes account of the additional displacing force required to overcome the stiffening of the inner member by the mandrel 28.

The jaws 23 are then retracted from the outer member and the mandrel 28 is withdrawn from the inner member. At this point additional fluid is fed into the press table cylinder 30 to converge the telescoped members to the desired length of the finished steering column. The force required to move the inner member through this last small distance is carefully measured as a final check on the displacement load needed to effect telescoping contraction of the steering column.

It will be apparent that the device of this invention is not only applicable to steering columns, as herein described for purposes of illustration, but that it is also useful as an automobile-bumper mounting, where it can serve to absorb or reduce the impact of a collision, and as an energy-absorbing device connected between an automobile seatbelt and the body structure of an automobile. The device is particularly useful in such applications as those last-mentioned because of its ability to accommodate substantial lateral components of load force and its ability to absorb repeated shock loads if its members are drawn back to their initial positions after each loading.

From the foregoing description taken with the accompanying drawings it will be evident that this invention provides a reliable energy absorbing device capable of functioning repeatedly, and also provides a simple and inexpensive method of making that energy-absorbing device.

Those skilled in the art will appreciate that the invention can be embodied in forms other than as herein disclosed for purposes of illustration.

The invention is defined by the following claims:

1. An energy-absorbing device of the type compromising a pair of elongated members that are constrained to lengthwise motion relative to one another and are normally in lengthwise overlapping relation, one of said members being displaceable lengthwise along the other in response to an endwise force that is in excess of a predetermined magnitude, said device being characterized by:
   A. one of said members comprising a wall of substantially hard but elastic material which is undulatory in transverse section to define a plurality of bays that open in alternately opposite transverse directions and each of which bays extends a substantial distance along the member, the undulatory shape of said wall providing for its elastic deformation transversely of its length;
   B. the other of said members having a plurality of spherical indentations that open into each of certain said bays and are longitudinally spaced from one another; and
   C. a hard ball for each of said indentations, each of said balls being confined between its indentation and the bay into which the same opens and having a diameter large enough to be held against displacement relative to said other member by its engagement in its indentation and to effect local elastic deformation of the first-mentioned member.

2. An energy-absorbing device of the type comprising a pair of telescoped elongated members, one of which is adapted to be displaced lengthwise relative to the other in response to an endwise force that is in excess of a predetermined magnitude, said device being characterized by;
   A. one of the telescoped members being hollow and having its wall of elastically deformable but substantially hard material and so shaped in cross section along a substantial portion of its length that said wall is circumferentially undulating, defining, around the circumference of said member, a plurality of alternate radially outwardly and radially inwardly opening bays;
   B. the other of said members having a plurality of longitudinally spaced spherical indentations opening to and radially opposite each of the bays in the first mentioned member that open in the direction toward said other member; and
   C. a plurality of hard balls, one for each of said indentations, each of said balls being of a size
      1. to be confined by its engagement between its indentation and the bay in the first mentioned member against displacement lengthwise of the other member, and
      2. to bear against the first mentioned member with sufficient force to locally elastically form it.

3. An energy-absorbing device of the type comprising inner and outer elongated members that are in telescoped relation, and a plurality of axially spaced groups of hard balls confined between the members, each group comprising a plurality of balls that are circumferentially spaced apart, each said ball being snugly engaged with both of the members and said balls allowing lengthwise motion of one of the members relative to the other only in response to an endwise force upon said one member that is in excess of a predetermined magnitude, said energy-absorbing device being characterized by:
   A. one of the telescoped members being hollow and having its wall of elastically deformable but hard material and so shaped in cross section along a substantial portion of the length of said member that said wall has a circumferentially undulating configuration, defining a plurality of bays that open in one radial direction and alternate around the circumference of the member with an equal number of bays that open in the opposite radial direction, said bays rendering said member locally elastically compressible radially;
   B. all of said balls being received in bays that open in one radial direction; and
   C. the other member having for each ball a spherical socket that opens to the bay in which the ball is received and in which socket the ball is seated to be confined against displacement relative to said other member.

4. The method of making an energy-absorbing device of the character described which is characterized by:
   A. producing a hollow inner member having a wall of subantially hard but elastically deformable material, which wall, along a substantial portion of the length of the inner member, has a circumferentially undulating configuration in cross section and thus defines a plurality of radially outwardly opening bays that alternate around the circumference of the inner member with radially inwardly opening bays;
   B. producing a tubular outer member of substantially hard material that is plastically deformable under load and which is of such diameter that that the inner member is freely axially receivable therein;
   C. by means of a readily frangible bonding material securing a plurality of hard balls to the inner member at axially spaced locations in each of said radially outwardly opening bays, said balls being of such diameter as not to interfere with free axial insertion of the inner member into the outer member;
   D. establishing and maintaining the inner and outer members in telescoped relationship;
   E. establishing rigid backup means inside the inner member radially inwardly opposite each of said balls for resisting radially inward displacement of the balls in response to radially inward force upon them;
   F. with the rigid backup means in place, forcefully convergingly jaws against the outer surface of the outer member in the neighborhood of each of the balls, to form a radially inwardly opening socket in the outer member for each ball by which the ball is confined against displacement relative to the outer member;
   G. releasing said jaws from the outer member; and
   H. withdrawing the backup means from the inner member.

5. The method of claim 4, further characterized by:
   A. while forcing said jaws against the outer member,
      1. effecting a continuous but slow axial displacement of the inner and outer members relative to one another, and
      2. measuring the force required to effect such axial displacement; and
   B. terminating the application of converging force to the jaws when the force required to effect axial relative displacement of said members reaches a predetermined magnitude.

UNITED STATES PATENT OFFICE
CERTIFICATE OF CORRECTION

Patent No. 3,604,285　　　　　　　Dated September 14, 1971

Inventor(s) John Erland Sixten Olsson

It is certified that error appears in the above-identified patent and that said Letters Patent are hereby corrected as shown below:

Column 1　line 69　(Specification Page 4 line 16)
Insert "not" after --is--

Column 3　line 50　(Specification Page 9 line 25)
--are-- should read "area"

Column 5　line 10　Claim 1
--compromising-- should read "comprising"

Column 6　line 32　Claim 4
Delete --that-- before "the"

Signed and sealed this 7th day of March 1972.

(SEAL)
Attest:

EDWARD M. FLETCHER, JR.　　　　ROBERT GOTTSCHALK
Attesting Officer　　　　　　　Commissioner of Patents